US011384252B2

(12) United States Patent
Van Casteren et al.

(10) Patent No.: US 11,384,252 B2
(45) Date of Patent: Jul. 12, 2022

(54) AQUEOUS COATING COMPOSITION

(71) Applicant: COVESTRO (NETHERLANDS) B.V., Nieuwegein (NL)

(72) Inventors: Ilse Van Casteren, Echt (NL); Ronald Tennebroek, Echt (NL); Gerardus Cornelis Overbeek, Echt (NL); Jourraine Celestijn, Echt (NL)

(73) Assignee: COVESTRO (NETHERLANDS) B.V., Geleen (NL)

( * ) Notice: Subject to any disclaimer, the term of this patent is extended or adjusted under 35 U.S.C. 154(b) by 0 days.

(21) Appl. No.: 16/483,812

(22) PCT Filed: Feb. 7, 2018

(86) PCT No.: PCT/EP2018/053067
§ 371 (c)(1),
(2) Date: Aug. 6, 2019

(87) PCT Pub. No.: WO2018/146144
PCT Pub. Date: Aug. 16, 2018

(65) Prior Publication Data
US 2020/0024473 A1 Jan. 23, 2020

(30) Foreign Application Priority Data

Feb. 8, 2017 (EP) .................... 17155247
Feb. 8, 2017 (EP) .................... 17155248
Feb. 8, 2017 (EP) .................... 17155251
Feb. 8, 2017 (EP) .................... 17155252

(51) Int. Cl.
| | | |
|---|---|---|
| C09D 175/04 | (2006.01) |
| C08G 18/08 | (2006.01) |
| C08G 18/10 | (2006.01) |
| C08G 18/32 | (2006.01) |
| C08G 18/70 | (2006.01) |
| C08G 18/72 | (2006.01) |
| C08G 18/75 | (2006.01) |
| C08G 18/76 | (2006.01) |
| C08K 5/3415 | (2006.01) |
| C08K 5/57 | (2006.01) |
| C08L 75/04 | (2006.01) |
| C08G 18/34 | (2006.01) |
| C08G 18/73 | (2006.01) |
| C09D 15/00 | (2006.01) |
| C08K 5/17 | (2006.01) |
| C08L 75/16 | (2006.01) |
| C09D 175/14 | (2006.01) |
| C08L 75/14 | (2006.01) |
| C09D 175/16 | (2006.01) |
| C08G 18/67 | (2006.01) |

(52) U.S. Cl.
CPC ....... *C09D 175/04* (2013.01); *C08G 18/0823* (2013.01); *C08G 18/10* (2013.01); *C08G 18/3228* (2013.01); *C08G 18/34* (2013.01); *C08G 18/672* (2013.01); *C08G 18/706* (2013.01); *C08G 18/722* (2013.01); *C08G 18/73* (2013.01); *C08G 18/755* (2013.01); *C08G 18/758* (2013.01); *C08G 18/7671* (2013.01); *C08K 5/17* (2013.01); *C08K 5/3415* (2013.01); *C08K 5/57* (2013.01); *C08L 75/04* (2013.01); *C08L 75/14* (2013.01); *C08L 75/16* (2013.01); *C09D 15/00* (2013.01); *C09D 175/14* (2013.01); *C09D 175/16* (2013.01); *C08G 2150/00* (2013.01); *C08L 2201/54* (2013.01)

(58) Field of Classification Search
None
See application file for complete search history.

(56) References Cited

U.S. PATENT DOCUMENTS

| | | | | |
|---|---|---|---|---|
| 6,147,155 A | 11/2000 | Yonek et al. | | |
| 6,787,596 B1* | 9/2004 | Maier | ................ | C08F 283/006 |
| | | | | 524/507 |
| 2002/0165335 A1* | 11/2002 | Kobata | .............. | C08G 18/8096 |
| | | | | 528/45 |
| 2014/0364552 A1 | 12/2014 | Katakami | | |
| 2016/0319153 A1 | 11/2016 | Tennebroek et al. | | |

FOREIGN PATENT DOCUMENTS

| | | |
|---|---|---|
| CN | 102516465 | 6/2012 |
| WO | 2005/058995 | 6/2005 |

OTHER PUBLICATIONS

International Search Report for PCT/EP2018/053067, dated May 11, 2018, 3 pages.
Written Opinion of the ISA for PCT/EP2018/053067, dated May 11, 2018, 4 pages.

* cited by examiner

*Primary Examiner* — Jeffrey D Washville
(74) *Attorney, Agent, or Firm* — Nixon & Vanderhye P.C.

(57) ABSTRACT

The present invention relates to an aqueous coating composition comprising polyurethane A and vinyl polymer, wherein the polyurethane A comprises as building blocks at least: (a) a polyisocyanate(s) containing at least two cyclic groups, (b) a non-cyclic aliphatic diisocyanate(s) whereby the non-cyclic aliphatic group connecting the two isocyanate groups has from 4 to 36 carbon atoms, and (c) a component(s) containing an isocyanate-reactive group(s), whereby the summed amount of (a) and (b) is 10 to 60 wt. %, relative to the total weight amount of components used to prepare the polyurethane A; and whereby the weight ratio between (a) and (b) is in the range from 50:50 to 99:1.

23 Claims, No Drawings

AQUEOUS COATING COMPOSITION

This application is the U.S. national phase of International Application No. PCT/EP2018/053067 filed 7 Feb. 2018 which designated the U.S. and claims priority to EP Patent Application No. 17155248.2 filed 8 Feb. 2017, EP Patent Application No. 17155247.4 filed 8 Feb. 2017, EP Patent Application No. 17155251.6 filed 8 Feb. 2017, and EP Patent Application No. 17155252.4 filed 8 Feb. 2017, the entire contents of each of which are hereby incorporated by reference.

The present invention relates to an aqueous coating composition comprising polyurethane and vinyl polymer, a process for preparing such a composition and a substrate having a coating obtained from such a composition.

It is well known in the coating industry that polyurethane binders can be applied to a variety of substrates to provide coatings with good mechanical and chemical resistances.

Urethane binders often require solvent in the production process in order to reduce the viscosity of the prepolymer to acceptable values. However, the legislation regarding the presence of VOC's (volatile organic components) in indoor applied binders is under pressure. The use of solvents containing VOC's in the urethane prepolymer preparation is therefore less and less preferred and a lot of effort and energy is required to remove such solvent after preparation. As described in WO-A-2005/058995, the use of vinyl monomers as diluent have shown to be a good alternative for solvent containing VOC's, leading to urethane acrylic hybrids. The polyurethane is obtained from a polyurethane pre-polymer (a) made by reacting a polyisocyanate and isocyanate-reactive compound with an active-hydrogen chain extending compound (b), whereby the polyisocyanate is in particular $H_{12}$MDI (i.e. dicyclohexylmethane-4,4'-diisocyanate with usually less than 10 wt. % of isomers of dicyclohexylmethane-4,4'-diisocyanate (in particular dicyclohexylmethane-2,4'-diisocyanate)).

It has been found that the urethane-vinyl aqueous coating compositions containing polyurethanes as described in WO-A-2005/058995 result in high minimum-film-forming temperature MFFT. As is generally known, the MFFT of a coating composition can be reduced by the presence of coalescents. However, the legislation with respect to the presence of coalescents becomes more and more severe since coalescents for example may cause skin irritation and have a negative impact on the (indoor) air quality and/or the amount of Volatile Organic Compounds (VOC's) in the coating composition may be increased by increased amounts of coalescents.

The object of the present invention is to reduce the amount of coalescent in an aqueous coating composition comprising polyurethane and vinyl polymer which is required to obtain a specific MFFT, while the stain resistances of the coating against ammonia, water, ethanol, coffee and/or red wine are at least retained at sufficient level.

The object of the present invention has been achieved by providing an aqueous coating composition comprising polyurethane A and vinyl polymer, wherein the polyurethane A is obtained by the reaction of at least:
(a) a polyisocyanate(s) containing at least two cyclic groups,
(b) a non-cyclic aliphatic diisocyanate(s) whereby the non-cyclic aliphatic group connecting the two isocyanate groups has from 4 to 36 carbon atoms, and
(c) a component(s) containing isocyanate-reactive group(s), whereby the summed amount of (a) and (b) is 10 to 60 wt. %, relative to the total weight amount of components used to prepare the polyurethane A; and whereby the weight ratio between (a) and (b) is in the range from 50:50 to 99:1.

It has surprisingly been found that the MFFT of the coating composition can be reduced by using a polyurethane A as claimed compared to using a polyurethane based on polyisocyanate (a) but not diisocyanate (b) (thus whereby the weight ratio between (a) and (b) is 100:0), while in addition the stain resistances against ammonia, water, ethanol, coffee and/or red wine at least remain at sufficient level.

Methods for preparing polyurethanes are known in the art and are described in for example the Polyurethane Handbook $2^{nd}$ Edition, a Carl Hanser publication, 1994, by G. Oertel. The polyurethane A present in the aqueous coating composition may be prepared in a conventional manner by reacting at least (a), (b) and (c) by methods well known in the prior art. Usually an isocyanate-terminated polyurethane pre-polymer (I) is first formed by the reaction of components (a), (b) and (c) which is then preferably chain extended with an active hydrogen containing compound (II).

Component (a)

Component (a) is a polyisocyanate(s) containing at least two cyclic groups. Cyclic is defined here as a closed ring of carbon atoms, either aromatic or aliphatic. Preferably component (a) is a diisocyanate(s). Component (a) is preferably a polyisocyanate(s) containing at least two cycloaliphatic groups, a polyisocyanate(s) containing at least two aromatic groups, a polyisocyanate(s) containing at least one cycloaliphatic group and at least one aromatic group, and any mixture thereof. More preferably, component (a) is a polyisocyanate(s) containing at least two cycloaliphatic groups.

The polyisocyanate(s) containing at least two aromatic groups is preferably a polyisocyanate(s) containing at least two aromatic C6 groups and even more preferably contains two aromatic C6 groups. Non-limiting examples of component (a) containing at least two aromatic groups are methylene bis(phenyl isocyanate) (all isomers) and 3,3'-dimethyl-4,4'-biphenylene diisocyanate (CAS number 91-97-4). More preferably, the polyisocyanate(s) containing at least two aromatic groups is methylene bis(phenyl isocyanate) (all isomers). Even more preferably, the polyisocyanate(s) containing at least two aromatic groups is a mixture of 4,4'-methylene bis(phenyl isocyanate) and 2,4'-methylene bis(phenyl isocyanate).

More preferably, component (a) is a polyisocyanate(s) containing at least two cycloaliphatic groups and even more preferably containing two cycloaliphatic groups. Even more preferably, component (a) is a polyisocyanate(s) containing at least two cyclohexane groups and even more preferably containing two cyclohexane groups. Preferred examples of a polyisocyanate(s) containing at least two cyclohexane groups are dicyclohexylmethane diisocyanate (all isomers). Even more preferably, component (a) is H12MDI (CAS number 5124-30-1).

Component (b)

Component (b) is a non-cyclic aliphatic diisocyanate(s) whereby the non-cyclic aliphatic group connecting the two isocyanate groups contains from 4 to 36 carbon atoms. Non-cyclic aliphatic diisocyanate(s) are those which comprise exclusively linear or branched aliphatic chains. As used herein, a non-cyclic aliphatic Cx-Cy diisocyanate means a diisocyanate whereby the two isocyanate groups are connected via a non-cyclic aliphatic group containing from x to y carbon atoms, Preferably, component (b) is a non-cyclic aliphatic C4-C18 diisocyanate(s), more preferably a non-cyclic aliphatic C4-C12 diisocyanate(s), more preferably a non-cyclic aliphatic C4-C9 diisocyanate(s), even more preferably a non-cyclic aliphatic C4-C8 diisocyanate(s) and even more preferably a non-cyclic aliphatic C4-C6 diisocyanate(s). Non-limiting examples of component (b) are 1,4-butanediisocyanate (CAS number 4538-37-8), 1,6-hexanediisocyanate (CAS number 822-06-0), 1,8-octanediisocyanate (CAS number 10124-86-4), mixture of 2,2,4-trimethyl-hexamethylenediisocyanate and 2,4,4-trimethyl-hexamethylenediisocyanate (CAS number 32052-51-0). Most preferably, component (b) is 1,6-diisocyanatohexane (also referred to as 1,6-hexanediisocyanate) (CAS number 822-06-0).

The summed amount of (a) and (b) relative to the total weight amount of components used to prepare the polyurethane A is from 10 to 60 wt. %, more preferably from 20 to 55 wt. % and even more preferably from 25 to 50 wt. %. For the sake of reduced cost and providing a range of coating properties, the polyisocyanates (a) and (b) may be combined with one or more different polyisocyanates selected from more conventional types used for coating compositions. The polyisocyanates (a) and (b) preferably constitutes as least 70 wt. % of the total weight amount of the polyisocyanates used to prepare the polyurethane A, preferably at least 90 wt. % and most preferably 100 wt. %.

The weight ratio of (a) to (b) is in the range from 50:50 to 99:1, preferably from 60:40 to 95:5, more preferably from 65:35 to 90:10 and even more preferably from 70:30 to 90:10.

Component (c)

Component (c) is a component(s) containing at least one isocyanate-reactive group(s), also referred to as isocyanate-reactive component(s) (c). A preferred isocyanate-reactive group is a hydroxyl group.

Component (c) preferably includes an isocyanate-reactive component(s) containing ionic and/or potentially ionic water-dispersing groups (component (c)(i)). The amount of isocyanate-reactive component(s) containing ionic or potentially ionic water-dispersing groups relative to the total weight amount of components used to prepare the polyurethane A is usually from 1 to 15 wt. %, preferably from 3 to 12 wt. % and even more preferably from 4 to 10 wt. %. As used herein, potentially anionic dispersing group means a group, which under the conditions of the polyurethane preparation reaction, can be converted into an anionic group by salt formation (i.e. deprotonating the group by a base). Preferred ionic water-dispersing groups are anionic water-dispersing groups. Preferred anionic water-dispersing groups are carboxylic, phosphoric and/or sulphonic acid groups. Examples of such components (c) include carboxyl containing diols, for example dihydroxy alkanoic acids such as 2,2-dimethylol propionic acid (DMPA) or 2,2-dimethylolbutanoic acid (DMBA). Alternatively sulphonic acid groups may be used as potentially anionic water-dispersing groups. The anionic water-dispersing groups are preferably fully or partially in the form of a salt. Conversion to the salt form is optionally effected by neutralisation of the polyurethane pre-polymer with a base, preferably during the preparation of a polyurethane pre-polymer and/or during the preparation of the aqueous composition of the present invention. If the anionic water-dispersing groups are neutralised, the base used to neutralise the groups is preferably ammonia, an amine or an inorganic base. Suitable amines include tertiary amines, for example triethylamine or N,N-dimethylethanolamine. Suitable inorganic bases include alkali hydroxides and carbonates, for example lithium hydroxide, sodium hydroxide, or potassium hydroxide. A quaternary ammonium hydroxide, for example $N^+(CH_3)_4(OH)$, can also be used. Generally a base is used as neutralizing agent which gives counter ions that may be desired for the composition. For example, preferred counter ions include $Li^+$, $Na^+$, $K^+$, $NH_4^+$ and substituted ammonium salts. Cationic water dispersible groups can also be used, but are less preferred. Examples include pyridine groups, imidazole groups and/or quaternary ammonium groups which may be neutralised or permanently ionised (for example with dimethylsulphate). A very suitable isocyanate-reactive component containing ionic or potentially ionic water-dispersing groups is dimethylol propionic acid (DMPA). The neutralising agent is preferably used in such an amount that the molar ratio of the ionic and potentially ionic water dispersing groups to the neutralizing groups of the neutralising agent are in the range of from 0.3 to 1.5, more preferably from 0.5 to 1.2 and even more preferably from 0.6 to 0.98. In preferred aqueous coating composition of the invention the neutralizing agent is a metal salt and/or ammonia.

Component (c) may also include an isocyanate-reactive component(s) containing non-ionic water-dispersing groups (further referred to as component (c)(ii)). Preferred non-ionic water-dispersing groups are polyalkylene oxide groups, more preferably polyethylene oxide groups. A small portion of the polyethylene oxide group can be replaced by propylene oxide segment (s) and/or butylene oxide segment (s), however the polyethylene oxide group should still contain ethylene oxide as a major component. The preferred ethylene oxide chain length is >4 ethylene oxide units, preferably >8 ethylene oxide units and most preferably >15 ethylene oxide units. Preferably the polyethylene oxide group has a Mw from 175 to 5000 Daltons, more preferably from 350 to 2200 Daltons, most preferably from 660 to 2200 Daltons. The amount of isocyanate-reactive component(s) containing non-ionic water-dispersing groups (component (c)(ii)) relative to the total weight amount of components used to prepare the polyurethane A is usually from 0 to 15 wt. %, preferably from 0 to 10 wt. % and even more preferably from 1 to 5 wt. %.

Component (c) usually further includes at least one other isocyanate-reactive component (c)(iii) than component (c)(i) and component (c)(ii). Isocyanate-reactive component (c)(iii) may be selected from any of the chemical classes of mono-ols and/or polyols that can be used in polyurethane synthesis and is different than any other component (c). Component (c)(iii) preferably has a number average molecular weight of from 500 to 6000. As used herein, the number average molecular weight of a hydroxyl group containing component is determined by multiplying the equivalent weight of the component with the OH functionality of the component (the OH functionality of the polyol is given by the supplier; in case the polyol is a diol, the OH functionality is 2). The equivalent weight of the component is calculated by dividing 56100 by the OH number of the component. The OH number of the component is measured by titration a known mass of component according to ASTM D4274 and is expressed as mg KOH/g.

In particular the isocyanate-reactive component (c)(iii) may be a polyester polyol, a polyesteramide polyol, a polyether polyol, a polythioether polyol, a polycarbonate polyol, a polyacetal polyol, a polyvinyl polyol and/or a polysiloxane polyol. Preferably, the isocyanate-reactive component (c)(iii) is selected from the group consisting of polyester(amide) polyols, polyether polyols, polycarbonate polyols and any mixture thereof. The amount of component (c)(iii) relative to the total weight amount of components (c) is usually at least 60 wt. %, preferably at least 70 wt. % and most preferably at least 85 wt. %.

The amount of component(s) (c) relative to the total weight amount of components used to prepare the polyurethane A is preferably from 40 to 90 wt. %, more preferably from 45 to 80 wt. % and even more preferably from 50 to 75 wt. %.

The acid value of the polyurethane A in the aqueous coating composition is preferably in the range from 5 to 65 mg KOH/g polyurethane A. As used herein, the acid value of the polyurethane A is determined according to DTN-EN ISO 2114.

Vinyl Polymer

The coating composition of the invention comprises, next to polyurethane, also vinyl polymer and in particular acrylic polymer. The presence of both polyurethane and vinyl polymer may be effected either by means of simple blending of preformed polyurethane and vinyl polymer dispersions or preferably by polymerisation in situ of vinyl monomers in the presence of a preformed polyurethane to form a hybrid system. By a polyurethane vinyl polymer hybrid is meant that a vinyl polymer is prepared by the free-radical polymerization of vinyl monomer(s) in the presence of a polyurethane.

Preferably the weight ratio of polyurethane to vinyl polymer present in the polyurethane vinyl polymer hybrid is in the range of from 95:5 to 15:85, more preferably from 90:10 to 20:80, most preferably 80:20 to 30:70.

The vinyl polymer(s) is obtained by polymerizing of vinyl monomer(s) using a conventional free radical yielding initiator system. Suitable free radical yielding initiators include mixtures partitioning between the aqueous and organic phases. Suitable free-radical-yielding initiators include inorganic peroxides such as ammonium persulphate hydrogen peroxide, hydrogen peroxide, organic peroxides, such as benzoyl peroxide, alkyl hydroperoxides such as t-butyl hydroperoxide and cumene hydroperoxide; dialkyl peroxides such as di-t-butyl peroxide; peroxy esters such as t-butyl perbenzoate and the like; mixtures may also be used. The peroxy compounds are in some cases advantageously used in combination with suitable reducing agents (redox systems) such as iso-ascorbic acid. Azo compounds such as azobisisobutyronitrile may also be used. Metal compounds such as Fe.EDTA (EDTA is ethylene diamine tetracetic acid) may also be usefully employed as part of the redox initiator system. The amount of initiator or initiator system to use is conventional, e.g. within the range of 0.05 to 6 wt % based on the weight of vinyl monomer used.

Preferably at least 80 wt. %, more preferably at least 95 wt. % and most preferably 100 wt. % of the total weight of vinyl monomers used are of α,β-mono-unsaturated vinyl monomers.

Examples of vinyl monomers include but are not limited to 1,3-butadiene, isoprene; trifluoro ethyl (meth)acrylate (TFEMA); dimethyl amino ethyl (meth)acrylate (DMAEMA); styrene, a-methyl styrene, (meth)acrylic amides and (meth)acrylonitrile; vinyl halides such as vinyl chloride; vinylidene halides such as vinylidene chloride; vinyl ethers; vinyl esters such as vinyl acetate, vinyl propionate, vinyl laurate; vinyl esters of versatic acid such as VeoVa 9 and VeoVa 10 (VeoVa is a trademark of Resolution); heterocyclic vinyl compounds; alkyl esters of monoolefinically unsaturated dicarboxylic acids such as di-n-butyl maleate and di-n-butyl fumarate and in particular, esters of acrylic acid and methacrylic acid of formula $CH_2=CR^4-COOR^5$ wherein $R^4$ is H or methyl and $R^5$ is optionally substituted alkyl or cycloalkyl of 1 to 20 carbon atoms (more preferably 1 to 8 carbon atoms) examples of which are methyl methacrylate, ethyl methacrylate, n-butyl (meth)acrylate (all isomers), octyl (meth)acrylate (all isomers), 2-ethylhexyl (meth)acrylate, isopropyl (meth)acrylate and n-propyl (meth)acrylate. Preferred monomers of formula $CH_2=CR^4-COOR^5$ include butyl (meth)acrylate (all isomers), methyl (meth)acrylate, octyl (meth)acrylate (all isomers) and ethyl (meth)acrylate. Preferably, at least 30 wt. %, more preferably at least 50 wt. % and even more preferably at least 70 wt. % of the total amount of vinyl monomer(s) used to prepare the vinyl polymer is selected from the group consisting of methyl methacrylate, butyl acrylate, butyl methacrylate, acrylonitrile, styrene and mixtures of two or more of said monomers. Preferably, the vinyl monomer(s) used to prepare the vinyl polymer is selected from the group consisting of styrene, methyl methacrylate, butyl acrylate, butyl methacrylate and mixtures thereof. More preferably at least 30 wt. %, preferably at least 50 wt. % and more preferably at least 70 wt. % of the total amount of the vinyl monomer(s) used to prepare the vinyl polymer is selected from styrene or methyl methacrylate.

The vinyl monomers may include vinyl monomers carrying functional groups such as cross-linker groups and/or water-dispersing groups. Such functionality may be introduced directly in the vinyl polymer by free-radical polymerisation, or alternatively the functional group may be introduced by a reaction of a reactive vinyl monomer, which is subsequently reacted with a reactive compound carrying the desired functional group. Examples of suitable vinyl monomers providing crosslinking groups include acrylic and methacrylic monomers having at least one free carboxyl or hydroxyl group, epoxy, acetoacetoxy or carbonyl group, such as acrylic acid and methacrylic acid, glycidyl acrylate, glycidyl methacrylate, aceto acetoxy ethyl methacrylate, allyl methacrylate, tetraethylene glycol dimethacrylate, divinyl benzene and diacetone acrylamide.

Vinyl monomers providing ionic or potentially ionic water-dispersing groups which may be used as additional vinyl monomers include but are not limited to (meth)acrylic acid, itaconic acid, maleic acid, citraconic acid and styrenesulphonic acid. Preferably the level of vinyl monomers providing ionic or potentially ionic water-dispersing groups is between 0 to 5 wt. %, more preferably between 0 and 1 wt. % and most preferably below 0.5 wt. % of the total level of vinyl monomers used.

Vinyl monomers providing non-ionic water-dispersing groups include alkoxy polyethylene glycol (meth)acrylates, preferably having a number average molecular weight of from 140 to 3000, may also be used. Examples of such monomers which are commercially available include ω-methoxypolyethylene glycol (meth)acrylates.

Preferably the weight average molecular weight (Mw) of the resultant vinyl polymer is at least 60,000 Daltons, more preferably in the range of from 100,000 to 6,000,000 Daltons and most preferably in the range of from 150,000 to 2,500,000 Daltons.

Coalescing agents (also referred to as coalescents or film-forming assistants) are used in coating composition such as for example paints for optimizing the film formation process of the polymeric binder particles. The film formation process in coating compositions involves the coalescence of the polymeric particles, during and after the evaporation of the diluents (in the present invention mainly water), thereby permitting contact and fusion of adjacent polymeric dispersion particles. Coalescing agents typically reduce the minimal film formation temperature of a coating composition. Non-limited examples of coalescents are organic co-solvents. Organic co-solvents may be added before, during or after polyurethane formation to control the viscosity. Examples of co-solvents also having the function of coalescent include water-miscible solvents such as 1-methyl-2- pyrrolidinone, glycols and glycol ethers such as butyldiglycol, dipropylene glycol methyl ether, acetone, methyl ethyl ketone and alkyl ethers of glycol acetates or mixtures thereof.

It has surprisingly been found that with the composition of the present invention the minimum film formation temperature can be lowered without having to increase the amount of coalescent in the coating composition. It has surprisingly been found that the coating composition of the present invention can have a minimum film formation temperature of lower than 50° C., even lower than 35° C., even lower than 25° C., even lower than 20° C. and even lower than 5° C. even when the coating composition contains reduced amount of coalescent. As used herein, reduced amount of coalescent means that the coating composition contains less than 10 wt. %, preferably less than 5 wt. % of coalescent, more preferably less than 3 wt. % of coalescent, more preferably less than 1 wt. % of coalescent by weight of the solids of coating composition of the present invention. With the composition of the present invention a minimum film formation temperature of lower than 50° C., even lower than 35° C., even lower than 25° C., even lower than 20° C., can be obtained even without the presence of coalescent in the aqueous coating composition. The solids content is determined by evaporation of the volatile compounds such as water and optionally solvent and volatile amines present in the aqueous coating composition.

Further, a low amount of organic co-solvent is advantageous in view of volatile organic co-solvent (VOC) levels and possible flammability risks. In particular for 1-methyl-2-pyrrolidinone (NMP), legislation on the labelling of products containing NMP becomes more and more severe. Therefore, the presence of minimum amounts of NMP or the absence of NMP is desired. The amount of 1-methyl-2-pyrrolidinone in the aqueous coating composition is preferably less than 3 wt. % by weight of solids content of the coating composition, preferably less than 1 wt. %, more preferably less than 0.5 wt. % and even more preferably is 0 wt. %. Further, a low residual or even no residual amount of free (non-polymerized) vinyl monomer is desired since the presence of free vinyl monomers in the coating composition or coating obtained from the coating composition can cause skin irritation.

The aqueous coating composition of the invention preferably contains tin in amount of preferably at most 50 ppm, more preferably at most 10 ppm, even more preferably at most 5 ppm, even more preferably at most 2 ppm and even more preferably the aqueous coating composition of the invention does not contain tin. The aqueous coating composition of the invention preferably contains tertiary amines like for example triethylamine in amount of preferably at most 1.5 wt. % (relative to the aqueous coating composition), more preferably at most 1 wt. %, even more preferably at most 0.5 wt. %, even more preferably at most 0.1 wt. % and even more preferably the aqueous coating composition of the invention does not contain tertiary amine(s).

The aqueous coating composition according to the present invention may further comprise other polymeric binders than the polyurethane A and the vinyl polymer. The total amount of polyurethane A and vinyl polymer present in the aqueous coating composition is preferably in the range from 20 to 55 wt. %, preferably from 25 to 50 wt. % (relative to the total weight of the aqueous coating composition).

The present invention further relates to a process for preparing an aqueous coating composition as described above comprising the following steps:

I. preparing an isocyanate-terminated polyurethane prepolymer by reacting at least components (a), (b) and (c):
   (a) a polyisocyanate(s) containing at least two cyclic groups,
   (b) a non-cyclic aliphatic diisocyanate(s) whereby the non-cyclic aliphatic group connecting the two isocyanate groups has from 4 to 36 carbon atoms, and
   (c) a component(s) containing at least one isocyanate-reactive group comprising
      (c)(i) isocyanate-reactive component(s) containing ionic and/or potentially ionic water-dispersing groups, and/or
      (c)(ii) an isocyanate-reactive component(s) containing non-ionic water-dispersing groups, and/or
      (c)(iii) isocyanate-reactive component(s) not comprised by (c)(i) and (c)(ii);
   (d) adding from 0 to 40 wt. % of diluent in step I,
   whereby the summed amount of (a) and (b) is 10 to 60 wt. %, relative to the total weight amount of components used to prepare the polyurethane A; and the weight ratio between (a) and (b) is in the range from 50:50 to 99:1; and where the amount of (d) is given relative to (a), (b), (c) and (d);
II. either blending the isocyanate-terminated polyurethane prepolymer with an aqueous phase comprising neutralization agent and optionally comprising further chain extending compound or either neutralizing the isocyanate-terminated polyurethane prepolymer by adding neutralizing agent to the isocyanate-terminated polyurethane prepolymer and subsequently (i) adding the neutralized isocyanate-terminated polyurethane prepolymer to water optionally comprising further chain extending compound or (ii) adding water optionally comprising further chain extending compound to the neutralized isocyanate-terminated polyurethane prepolymer; and
whereby, at the start of the reaction to prepare the isocyanate-terminated polyurethane pre-polymer, the process comprises feeding to the reactor either (A) components (a) and (b) and at least one of the components (c)(i), (c)(ii) and (c)(iii), either (B) component (a) and at least two of the components (b), (c)(i), (c)(ii) and (c)(iii) or either (C) component (b) and at least two of the components (a), (c)(i), (c)(ii) and (c)(iii); and
whereby the preparation of the polyurethane A is effected in the presence of <3 wt. % of 1-methyl-2-pyrrolidone by weight of the polyurethane A, preferably less than 1 wt. % of 1-methyl-2-pyrrolidone, more preferably less than 0.5 wt. % of 1-methyl-2-pyrrolidone and most preferably the preparation of the polyurethane A is effected in the absence of 1-methyl-2-pyrrolidone; and
whereby (i) the vinyl polymer is introduced into the coating composition before, during or after preparation of the polyurethane and/or (ii) vinyl monomer is added before, during or after preparation of the polyurethane and the vinyl monomer is polymerized by adding a free radical initiator to polymerize the vinyl monomer in the presence of the polyurethane.

In the process of the invention, preferably component (c)(i) is used to prepare the polyurethane A. Component (c)(iii) is preferably also used to prepare the polyurethane A.

The process comprises feeding to the reactor, at the start of the reaction to prepare the isocyanate-terminated polyurethane pre-polymer, either (A) components (a) and (b) and at least one of the components (c)(i), (c)(ii) and (c)(iii), either (B) component (a) and at least two of the components (b), (c)(i), (c)(ii) and (c)(iii) or either (C) component (b) and at least two of the components (a), (c)(i), (c)(ii) and (c)(iii). At least a part of the amount of these components are added to the reactor at the start of the reaction or the entire amount of these components are added to the reactor at the start of the reaction. The preparation of the isocyanate-terminated polyurethane pre-polymer is usually carried out at a temperature from 30 to 130° C., preferably from 70 to 110° C. Preferably, the process comprises feeding components (a) and (b) and at least one of the components (c)(i), (c)(ii) and (c)(iii) to the reactor at the start of the reaction to prepare the isocyanate-terminated polyurethane pre-polymer. More preferably, the process comprises feeding components (a), (b),(c)(i),(c)(iii) and optionally (c)(ii) to the reactor at the start of the reaction to prepare the isocyanate-terminated polyurethane pre-polymer.

Step I of the process of the present invention is preferably facilitated by the addition of from 1 to 40 wt. % of diluent (relative to the total weight amount of components used to prepare the isocyanate-terminated polyurethane prepolymer) in order to reduce the viscosity of the pre-polymer, more preferably from 5 to 35 wt. % and even more preferably from 10 to 25 wt. % of diluent is added. Preferably the diluent is added at the start of the reaction in step I. In case the coating composition comprises polyurethane-vinyl polymer hybrid the diluent in step I is preferably a vinyl monomer. Otherwise, the diluent in step I is preferably non protic organic cosolvent(s). Examples of cosolvents include water-miscible solvents such as acetone, methyl ethyl ketone and alkyl ethers of ethylene or propylene glycols and its analogues or alkyl ethers of glycol acetates and its analogues or mixtures thereof. A preferred diluent (d) (other than vinyl monomer(s)) is acetone since this can easily be removed from the coating composition at the end of the polyurethane preparation.

U.S. Pat. No. 6,147,155 relates to a process for preparing aqueous polyurethane dispersion based on cyclic diisocyanates and non-cyclic diisocyanates, in particular H12MDI and hexamethylene diisocyanate (HDI) or isophorone diisocyanate (IPDI) and HDI are used as polyisocyanates. The teaching of U.S. Pat. No. 6,147,155 is that a multi-step process is required to prepare the aqueous polyurethane dispersion with good processing, i.e. in the first stage a cyclic diisocyanate is reacted with a compound containing one or more isocyanate-reactive groups and at least one carboxylic acid or carboxylate groups to form an intermediate product; after the preparation of this intermediate product, the remaining components (among others the non-cyclic diisocyanate) are reacted with the intermediate product to form the NCO pre-polymer. It has further been found that the use of the coalescent 1-methyl-2-pyrrolidone (NMP) in the first stage is essential to reduce viscosity and avoid phase separation and settling in the first stage. However, legislation on the labelling of products containing NMP becomes more and more severe. Therefore, proposed changes in legislation on the labelling of products containing NMP are resulting in increased efforts to minimize and even eliminate the use of NMP. Therefore, the presence of minimum amounts of NMP or the absence of NMP is highly desirable. Further, U.S. Pat. No. 6,147,155 does not teach that the MFFT of the aqueous polyurethane coating composition can be reduced by the use of a polyisocyanate(s) containing at least two cyclic groups and a non-cyclic aliphatic C4-C36 diisocyanate(s). The presence of large amounts of the coalescent NMP present in all examples result in low MFFT's (<5° C.). Further it has been found that, compared to the use of a polyisocyanate(s) containing one cyclic groups (such as for example isophorone diisocyanate IPDI) and a non-cyclic aliphatic C4-C36 diisocyanate(s), the use of a polyisocyanate(s) containing at least two cyclic groups in combination with a non-cyclic aliphatic C4-C36 diisocyanate(s) results in that mechanical properties, like hardness and blocking, and stain resistance are not significantly affected and may even be better while the increase of the MFFT (due to the use of a polyisocyanate(s) containing at least two cyclic groups) is surprisingly reduced and thus coalescent demand is surprisingly reduced.

It has surprisingly been found that, contrary to the process as described in U.S. Pat. No. 6,147,155, it is possible to add component (a) and component (b) both at the start of the reaction to prepare the isocyanate-terminated polyurethane pre-polymer under the condition that the preparation of the polyurethane A and hence also the preparation of the isocyanate terminated polyurethane pre-polymer is effected in the presence of <3 wt. % of 1-methyl-2-pyrrolidone by weight of the polyurethane A, preferably in the presence of less than 1 wt. % of 1-methyl-2-pyrrolidone, more preferably in the presence of less than 0.5 wt. % of 1-methyl-2-pyrrolidone and most preferably the preparation of the polyurethane A is effected in the absence of 1-methyl-2-pyrrolidone. Hence, in the process of the invention, the isocyanate-terminated polyurethane pre-polymer can be prepared in a one-step process. It has furthermore surprisingly found that, contrary to the process described in U.S. Pat. No. 6,147,155, the well-known chain extending compounds containing at least two primary amino groups, like for example hydrazine and ethylene diamine, are suitable for chain extending the isocyanate-terminated polyurethane pre-polymer in the process of the invention. In the process as described in U.S. Pat. No. 6,147,155, it is necessary to use chain extenders that do not contain more than one unblocked primary or secondary amino group in order to overcome the difficulty of rapidly reaction of the chain extender with any unreacted, monomeric non-cyclic diisocyanates present in the isocyanate terminated polyurethane prepolymer. In the process of the present invention, the use of chain extenders that do not contain more than one unblocked primary or secondary amino group is not required, although they can also be applied as chain extenders. Further, the use of compounds containing unblocked primary and/or unblocked secondary amino groups is preferred in view of reduced VOC content of the coating composition.

In the present invention, the NCO:OH molar ratio of the isocyanate-terminated polyurethane prepolymer is preferably higher than 1, more preferably from 1.1 to 3 and even more preferably from 1.3 to 2.2.

Preferably, the coating composition of the present invention comprises a polyurethane vinyl polymer hybrid. In this case, the process for preparing the aqueous coating composition according to the invention preferably comprises the following steps I. preparing an isocyanate-terminated polyurethane prepolymer by reacting at least components (a), (b) and (c):
   (a) a polyisocyanate(s) containing at least two cyclic groups,
   (b) a non-cyclic aliphatic diisocyanate(s) whereby the non-cyclic aliphatic group connecting the two isocyanate groups has from 4 to 36 carbon atoms, and
   (c) a component(s) containing at least one isocyanate-reactive group comprising
     (c)(i) isocyanate-reactive component(s) containing ionic and/or potentially ionic water-dispersing groups, and/or
     (c)(ii) an isocyanate-reactive component(s) containing non-ionic water-dispersing groups, and/or (c)(iii) isocyanate-reactive component(s) not comprised by (c)(i) and (c)(ii);
(d) adding from 0 to 35 wt. % of vinyl monomer in step I, whereby the summed amount of (a) and (b) is 10 to 60 wt. %, relative to the total weight amount of components used to prepare the polyurethane A; and
the weight ratio between (a) and (b) is in the range from 50:50 to 99:1; and where the amount of (d) is given relative to (a), (b), (c) and (d);

II. either blending the isocyanate-terminated polyurethane prepolymer with an aqueous phase comprising neutralization agent and optionally comprising further chain extending compound or either neutralizing the isocyanate-terminated polyurethane prepolymer by adding neutralizing agent to the isocyanate-terminated polyurethane prepolymer and subsequently (i) adding the neutralized isocyanate-terminated polyurethane prepolymer to water optionally comprising further chain extending compound or (ii) adding water optionally comprising further chain extending compound to the neutralized isocyanate-terminated polyurethane prepolymer; and III. preferably adding vinyl monomer; and IV. adding a radical initiator to polymerize the vinyl monomer, whereby, at the start of the reaction to prepare the isocyanate-terminated polyurethane pre-polymer, the process comprises feeding to the reactor either (A) components (a) and (b) and at least one of the components (c)(i), (c(ii) and (c)(iii), either (B) component (a) and at least two of the components (b), (c)(i), (c(ii) and (c)(iii) or either (C) component (b) and at least two of the components (a), (c)(i), (c(ii) and (c)(iii); and whereby the preparation of the polyurethane A is effected in the presence of <3 wt. % of 1-methyl-2-pyrrolidone by weight of the polyurethane A, preferably in the presence of less than 1 wt. % of 1-methyl-2-pyrrolidone, more preferably in the presence of less than 0.5 wt. % of 1-methyl-2-pyrrolidone and most preferably in the absence of 1-methyl-2-pyrrolidone; and whereby vinyl monomer is added in step I and/or step III; and whereby the vinyl monomer is polymerized by adding a free radical initiator to polymerize the vinyl monomer in the presence of the polyurethane.

Some or all of the vinyl monomers may be present at the commencement of the preparation of the isocyanate-terminated prepolymer, or some or all of the vinyl monomers may be added during the course of the preparation, or some or all of the vinyl monomers may be added after having prepared the isocyanate-terminated prepolymer or some or all of the vinyl monomers may be added to the aqueous phase in which the urethane prepolymer is dispersed or some or all of the vinyl monomers may be added to the aqueous dispersion of the chain extended polyurethane (so after step II) in which case the vinyl monomer(s) swell into the chain extended polyurethane particles. The vinyl monomers are not polymerised until after chain extension has been carried out; thus step IV is preferably effected after step I and step II and in case step III is not optional, step IV is effected before step III, together with step III and/or after step III.

In a preferred embodiment of the process of the present invention, neutralizing and chain extending the isocyanate-terminated polyurethane prepolymer is effected by neutralizing the isocyanate-terminated polyurethane prepolymer, subsequently dispersing the neutralized isocyanate-terminated polyurethane prepolymer in water to obtain a dispersion and then adding chain extending compound (preferably water diluted chain extending compound) to said dispersion.

Preferably the isocyanate-terminated polyurethane prepolymer is chain extended with an active hydrogen-containing chain extending compound(s) other than water. Active hydrogen-containing chain extending compounds, which may be reacted with the isocyanate-terminated pre-polymer include amino-alcohols, primary or secondary diamines or polyamines (including compounds containing a primary amino group and a secondary amino group), hydrazine and substituted hydrazines. Examples of such chain extending compounds useful herein include 2-(methylamino)ethylamine, aminoethyl ethanolamine, aminoethylpiperazine, diethylene triamine, and alkylene diamines such as ethylene diamine, and cyclic amines such as isophorone diamine. Also compounds such as hydrazine, azines such as acetone azine, substituted hydrazines such as, for example, dimethyl hydrazine, 1,6-hexamethylene-bis-hydrazine, carbodihydrazine, hydrazides of dicarboxylic acids such as adipic acid dihydrazide, oxalic acid dihydrazide, isophthalic acid dihydrazide, amino sulphonates, hydrazides made by reacting lactones with hydrazine, bis-semi-carbazide, and bis-hydrazide carbonic esters of glycols may be useful. Preferred chain extending compounds are selected from the group consisting of hydrazine, a primary diamine(s), a secondary diamine(s), a compound(s) containing a primary amino group and a secondary amino group and any mixture thereof.

Preferably the molar ratio between the active hydrogen present in the active-hydrogen chain extending compound other than water to isocyanate (NCO) groups present in the isocyanate-terminated polyurethane pre-polymer is in the range of from 0.5:1 to 1.2:1, more preferably 0.6:1 to 1.1:1, especially 0.75:1 to 1.02:1 and most preferably 0.78:1 to 0.98:1. Preferably, either the isocyanate-terminated polyurethane pre-polymer is blended with an aqueous phase comprising neutralizing agent and the chain extending compound or either the neutralized isocyanate-terminated polyurethane pre-polymer is added to water comprising the chain extending compound or either (and more preferably) the neutralized isocyanate terminated polyurethane is blended with an aqueous phase and after blending the chain extending compound is added.

The present invention further relates to an aqueous coating composition comprising polyurethane A and less than 3 wt. % of 1-methyl-2-pyrrolidinone, wherein the polyurethane A comprising as building blocks at least:
(a) a polyisocyanate(s) containing at least two cyclic groups,
(b) a non-cyclic aliphatic diisocyanate(s) whereby the non-cyclic aliphatic group connecting the two isocyanate groups has from 4 to 36 carbon atoms, and
(c) a component(s) containing an isocyanate-reactive group(s), whereby the summed amount of (a) and (b) is 10 to 60 wt. %, relative to the total weight amount of components used to prepare the polyurethane A; and
whereby the weight ratio between (a) and (b) is in the range from 50:50 to 99:1;
wherein the polyurethane A is prepared by preparing a neutralized isocyanate-terminated polyurethane pre-polymer which is dispersed in water and which dispersed prepolymer is subsequently chain-extended with a chain-extending compound selected from the group consisting of unblocked hydrazine, an unblocked primary diamine(s), an unblocked secondary diamine(s), a compound(s) containing an unblocked primary amino group and an unblocked secondary amino group, and any mixture thereof. Non-limited examples of compounds containing an unblocked primary amino group and an unblocked secondary amino group are 2-(methylamino)ethylamine, aminoethyl ethanolamine, aminoethylpiperazine, diethylene triamine. The aqueous coating composition preferably comprises less than 1 wt. % of 1-methyl-2-pyrrolidinone by weight of solids content of the coating composition, more preferably the aqueous coating composition is free of 1-methyl-2-pyrrolidinone. More preferably, the aqueous coating composition is free of solvent. It has surprisingly been found that a polyurethane prepolymer obtained by reacting at least (a), (b) and (c) has a reduced viscosity compared to a polyurethane prepolymer obtained by reacting at least (a) and (c) (but not (b)), thereby allowing to use a reduced amount of solvent for preparing the prepolymer (resulting in that the aqueous coating composition of the present invention has a reduced VOC content), and even allowing to prepare the polyurethane prepolymer without the use of solvent (resulting in a zero VOC coating composition).

The present invention further relates to a method for coating a substrate selected from the group consisting of wood, metal, plastic, linoleum, concrete, glass and any combination thereof; where the method comprises
(i) applying an aqueous coating composition as described above or obtained with the process according as described above to the substrate; and
(ii) physically drying (by evaporation of volatiles) and optionally curing of the aqueous coating composition to obtain a coating.

The present invention further relates to a substrate having a coating obtained by (i) applying an aqueous coating composition according to the invention or obtained with the process according to the invention to a substrate and (ii) physically drying (by evaporation of volatiles) and optionally curing of the aqueous coating composition to obtain a coating. The substrate is preferably selected from the group consisting of wood, metal, plastic, linoleum, concrete, glass, packaging films, and any combination thereof. More preferably, a wooden substrate is applied.

The present invention is now illustrated by reference to the following examples. Unless otherwise specified, all parts, percentages and ratios are on a weight basis.

COMPONENTS AND ABBREVIATIONS USED

H12MDI=Dicyclohexylmethane-4,4'-diisocyanate available from Covestro
IPDI=Isophorondiisocyanate from Covestro
TMDI=Mixture of 2,2,4- and 2,4,4-trimethyl-hexamethyl-enediisocyanate from Evonik, CAS number 32052-51-0
HDI=Hexamethylenediisocyanate available from Covestro
DMPA=Dimethylolpropionic acid available from Perstorp polyols
Durez-ter S 1015-62=Hexanediol neopentyl glycol adipate copolymer available from Durez, OHV=62 mgKOH/g
pTHF 1000=Polytetramethylene ether glycol, OH-number=112.5 mg KOH/g available from BASF
PC C2200=Desmophen C2200 available from Covestro
CHDM=Cyclohexanedimethylol available from Eastman Chemical
BMA=n-Butylmethacrylate available from Dow Chemical
MMA=Methylmetacrylate available from Dow Chemical
BHT=Butylated hydroxyl toluene (inhibitor) available from Merisol
TEA=Triethylamine available from Arkema
Hydrazine=Hydrazine solution in water [16%] available from Arkema
IAA=Isoascorbic acid available from Brenntag Volkers Benelux BV
tBHPO=tert-Butyl hydroperoxide, available from Akzo Nobel Chemicals BV
FeEDTA=Iron-ethylenediaminetetracetic acid complex, 1% in water
Dowanol DPM=Di(propylene glycol) monomethyl ether (DDPM) available from Dow Benelux
BYK346=Silicone surfactant for aqueous coatings to improve substrate wetting available from BYK

EXAMPLES

The following examples were prepared and coatings were obtained and tested. The compositions of the examples and results are as shown in the tables below.

Minimum Film Formation Temperature MFFT

The MFFT is the lowest temperature at which a polymer or solid portion of an aqueous polymer dispersion (also called latex or emulsion) self-coalesces in the semi-dry state to form a continuous polymer film, which in turn acts as a binder for the rest of the solids in the paint film. At temperatures at and above the MFFT of the polymer a continuous film is formed. At temperatures below its MFFT the polymer cannot coalesce to form a continuous film and thus cannot bind together itself (or any pigments and extenders that may be present) and a "cracked, crazed or powdery" layer results. MFFT is measured on a Rhopoint MFFT-90 Minimum Film Forming Temperature Instrument using a wet film thickness of 90 µm.

Viscosity was determined with a Brookfield DV-I viscometer (spindle S61, 60 rpm, 23° C.)

Particle Size

The particle size was determined by photon correlation spectroscopy using a Malvern Zetasizer Nano zs. Samples are diluted until a concentration of approximately 0.1 g disp/liter.

Solids Content

The solids content of the dispersion was determined on a Mettler Toledo HB43-S Compact Halogen Moisture Analyzer. At the start of the measurement the Moisture Analyzer determines the weight of the sample, the sample is then heated to 130° C. by the integral halogen heating module and the volatile compounds vaporizes. During the drying process the instrument continually measures the weight of the sample. Once drying has been completed, the solids content of the sample is displayed as the final result.

Preparation of a Polyurethane-Vinyl Polymer Hybrid Dispersion

Example 1

Stage 1: A 1000 cm³ flask equipped with a thermometer and overhead stirrer was charged with HDI (36.7 g), H12MDI (57.4 g), DMPA (15.2 g), Durez-ter S 1015-62 (236.7 g), BHT (0.5 g) and MMA (104.0 g). The mixture was heated to 85° C. and kept at 85° C. for 2 hours. The NCO-content of the resultant isocyanate-terminated prepolymer was 2.9% (theoretical 3.6%). Then the mixture is cooled to 80° C. and TEA (10.3 g) is added. The NCO/OH molar ratio is 1.79.

A dispersion of the isocyanate-terminated prepolymer was made by feeding 307 g of the isocyanate-terminated prepolymer mixture over 1 hour to deionised water (526 g) The isocyanate-terminated prepolymer temperature during dispersion was kept at 80° C. and the dispersion temperature was controlled between 25 to 30° C. After dispersing 15.9% hydrazine (18.6 g) was added to the dispersion.

Stage 2: The radical polymerisation for producing a polyurethane vinyl hybrid dispersion having an urethane/vinyl ratio of 77/23 was carried out as follows:

To the dispersion prepared in Stage 1 was charged a 70% tert-butylhydroperoxide solution in water (0.26 g) and a 1% FeEDTA solution in water (0.21 g) followed by feeding a 1% iso-ascorbic acid solution in water (14.0 g) over a period of 15 minutes.

The resultant polyurethane vinyl hybrid dispersion was filtered through 75 micron filtercloths and the specifications are given in Table 2 below.

Examples 2-5 and Comparative Example A-D

In Examples 2-5 and Comparative Examples A-D the process as described for Example 1 was repeated except that different quantities and different constituents were used These quantities and components are specified below in Table 1. In Examples 2 and 3 a second acrylic phase was introduced by adding extra monomers. Unless specified otherwise, the amounts of the different components are expressed in grams. The specifications of the resulting compositions are represented in Table 2, the film properties in Table 4.

Comparative Example E

Comparative example E shows that a one-stage prepolymer process does not result in a low viscous polyurethane dispersion when using NMP A 2000 cm3 flask equipped with a thermometer and overhead stirrer was charged with components DMPA (50.8 g), Durez-terS1015-62 (788.9 g), NMP (346.5), HDI (122.41) and H12-MDI (191.5 g). The reaction was heated to 95° C. and kept at this temperature for 2 hours. The NCO content of the resultant isocyanate-terminated prepolymer was 3.4% on solid content (theoretically 3.6%). The prepolymer was cooled to 80° C. and TEA was added (37.9 g).

A dispersion of the isocyanate-terminated prepolymer was made by feeding 410 g of the isocyanate-terminated prepolymer over 1 hour to deionised water (341.0 g). The isocyanate-terminated prepolymer temperature during dispersion was kept at 80° C. and the dispersion temperature was controlled between 25 to 30° C. During dispersing the viscosity increased rapidly and a white high viscous paste was formed. The reaction was stopped.

Comparative Example F

Comparative example F shows that sequential process, first preparing an adduct of H12MDI with DMPA in monomer, is not possible without NMP. A 1000 cm3 flask equipped with a thermometer and overhead stirrer was charged with components DMPA (15.2 g), MMA (104.0 g), Ionol cp (0.4 g) and H12-MDI (57.4). The reaction was heated to 85° C. and kept at this temperature for 2 hours.

TABLE 1

| Compounds | Comp. Ex A | Ex. 2 | Ex. 3 | Ex. 4 | Ex. 5 | Comp. Ex. B | Comp. Ex C | Comp. Ex D |
|---|---|---|---|---|---|---|---|---|
| DMPA | 15.2 | 25.4 | 25.4 | 22.5 | 22.5 | 22.5 | 22.5 | 22.5 |
| Durez-ter S 1015-62 | 220.3 | — | — | — | — | — | — | — |
| pTHF1000 | — | 345.1 | 329.1 | — | 220.5 | 205.5 | 228.6 | 236.9 |
| PC C2200 | — | — | — | 294.2 | — | — | — | — |
| CHDM | — | — | — | — | 13.5 | 13.5 | 13.5 | 13.5 |
| H12MDI | 110.5 | 125.8 | 135.6 | 113.3 | 154.8 | 208.5 | | |
| IPDI | — | — | — | — | — | — | 185.4 | 141.7 |
| HDI | — | 80.5 | — | 20 | 38.7 | — | — | 35.4 |
| TMDI | — | — | 86.7 | — | — | — | — | — |
| MMA | 104.0 | 173.3 | 173.3 | 75 | 150 | 150 | 150 | 150 |
| BMA | — | — | — | 75 | — | — | — | — |
| BHT | 0.5 | 0.7 | 0.7 | 0.5 | 0.5 | 0.5 | 0.5 | 0.5 |
| NCO/OH ratio prepol | 1.79 | 1.79 | 1.79 | 1.75 | 1.7 | 1.7 | 1.7 | 1.7 |
| NCO % prepolymer | 3.16 | 4.55 | 4.43 | 3.12 | 4.66 | 4.78 | 4.72 | 4.75 |
| TEA | 11.4 | 17.2 | 17.2 | 12.7 | 15.3 | 15.3 | 15.3 | 15.3 |
| Prepolymer feed [g] | 308 | 230 | 230 | 460 | 487 | 487 | 487 | 487 |
| water | 416 | 397 | 397 | 788 | 821 | 821 | 821 | 821 |
| Hydrazine [15.9%] | 20.4 | 21.0 | 21.4 | 30.1 | 47.4 | 48.7 | 48.0 | 48.4 |
| tBHPO[70%] | 0.26 | 0.19 | 0.19 | 0.42 | 0.44 | 0.44 | 0.44 | 0.44 |
| FeEDTA [1%] | 0.21 | 0.16 | 0.16 | 0.34 | 0.36 | 0.36 | 0.36 | 0.36 |
| iAA[1%] | 14.04 | 10.4 | 10.4 | 22.5 | 23.8 | 23.8 | 23.8 | 23.8 |
| MMA $2^{nd}$ phase | — | 63.4 | 63.4 | — | — | — | — | — |
| tBHPO[70%] | — | 0.24 | 0.24 | — | — | — | — | — |
| FeEDTA [1%] | — | 0.19 | 0.19 | — | — | — | — | — |
| iAA[1%] | — | 12.7 | 12.7 | — | — | — | — | — |
| Water | — | 100 | 100 | — | — | — | — | — |

Reaction product was not soluble in MMA resulting in phase separation and settling and reaction was stopped.

TABLE 2

| Example | Ex. 1 | Comp. Ex. A | Ex. 2 | Ex. 3 | Ex. 4 | Ex. 5 | Comp. Ex B | Comp. Ex C | Comp. Ex D |
|---|---|---|---|---|---|---|---|---|---|
| Solids (%) | 35 | 40 | 35 | 35 | 34 | 35 | 35 | 34 | 35 |
| pH | 7.5 | 7.8 | 7.0 | 7.3 | 7.7 | 7.8 | 8.0 | 7.5 | 7.5 |
| Viscosity* | 1445 | 71 | 76 | 13 | 1470 | 50 | 40 | 30 | 30 |
| Particle size (nm) | 147 | 68 | 108 | 81 | 213 | 67 | 68 | 62 | 67 |
| MFFT (° C.) | <5 | 29 | 18 | 29 | 25 | 40 | 55 | 16 | 7 |

*A Brookfield viscosity at 25° C. (mPa · s)

To 30 g of the final dispersions of Example 1 and Comparative Example A different amounts of coalescent, Dowanol DPM were added in amounts of respectively 0.3 [1%], 0.6 [2%], 0.9 [3%] and 1.2 g [4%]. The urethane/acrylic hybrid binders according to the invention show a low minimal film formation temperature and coalescent demand is low as demonstrated in Table 3.

TABLE 3

|  | MFFT [° C.] [0% Dowanol DPM] | MFFT [° C.] [1% Dowanol DPM] | MFFT [° C.] [2% Dowanol DPM] | MFFT [° C.] [3% Dowanol DPM] | MFFT [° C.] [4% Dowanol DPM] |
|---|---|---|---|---|---|
| Ex. 1 | <5 |  |  |  |  |
| Comp. Ex. A | 29 | 25 | 21 | 13 | <5 |

The dispersions prepared in Examples 1-5 and Comparative Examples A-D were formulated as described in Table 4. The formulated compositions were cast onto a Leneta test chart using a wire rod at a wet film thickness of 150 micron. Coalescent was added to the dispersion in such an amount that a continuous defect-free film could be formed at the applied temperature conditions in order to be able to determine the stain resistances of the coating. The cast films were then allowed to dry for 24 hours at room temperature before aging for 16 hours at 50° C. The coatings were allowed to cool to room temperature for 1 hour. The stain resistance of the coated cards towards the following stains were then assessed: ammonia, water, red wine, ethanol (48%), coffee. In all cases, a spot (1 cm²) of the respective stain was placed on the coating and covered with a piece of filter paper and a watch glass. After the test periods, the spot was gently wiped off with a tissue and the film was assessed for its integrity. This was rated between 0 to 5, where:
Grade 5—No change; Test area indistinguishable from adjacent surrounding area.
Grade 4—Minor change; Test area distinguishable from adjacent surrounding area, only when the light source is mirrored on the test surface and is reflected towards the observer's eye, e. g. discoloration, change in gloss and color. No change in the surface structure, e.g. swelling, fiber raising, cracking, blistering.
Grade 3—Moderate change; Test area distinguishable from adjacent surrounding area, visible in several viewing directions, e. g. discoloration, change in gloss and colour. No change in the surface structure, e.g. swelling, fibre raising, cracking, blistering.
Grade 2—Significant change; Test area clearly distinguishable from adjacent surrounding area, visible in several viewing directions, e. g. discoloration, change in gloss and colour.
Grade 1—Strong change; Test area clearly distinguishable from adjacent surrounding area, visible in several viewing directions, e. g. discoloration, change in gloss and colour, and/or the surface material being totally or partially removed.

For comparative example A, 7 wt % Dowanol DPM was required to obtain a continuous film starting from a WFT of 150 μm.

Stain resistances of the coating of the Examples versus of the Comparative Example clearly demonstrate that with low amount of coalescent sufficient level and mostly similar level of stain resistances can be achieved. Lowering the amount of Dowanol DPM of Comparative Examples A-D resulted in that no continuous defect-free film could be obtained and hence stain resistances of the coating were very poor.

TABLE 4

|  |  | Ex. 1 | Comp. Ex A | Ex. 2 | Ex. 3 | Ex. 4 | Ex 5 |
|---|---|---|---|---|---|---|---|
| Dispersion | g | 30 | 30 | 30 | 30 | 30 | 30 |
| Water | g | 0 | 2.2 | 0 | 0 | 0 | 0 |
| Dowanol DPM | g | 0.3 | 2.1 | 3.0 | 3.0 | 2.4 | 2.7 |
| Solid formulation | % | 35 | 35 | 32 | 32 | 31 | 32 |
| BYK 346 | g | 0 | 0 | 0.12 | 0.12 | 0.04 | 0.2 |
| Stains |  |  |  |  |  |  |  |
| Ammonia | 2 min | 5 | 5 | 5 | 5 | 5 | 5 |
| Ethanol 48% | 1 h | 1 | 1 | 5 | 5 | 1 | 5 |
| Red Wine | 6 h | 5 | 5 | 2 | 2 | 5 | 3 |
| Coffee | 1 h | 2 | 3 | 2 | 2 | 3 | 3 |
| Coffee | 16 h | 1 | 1 | 2 | 2 | 2 | 3 |
| Water | 16 h | 5 | 5 | 5 | 5 | 5 | 5 |
| Water | 24 h | 5 | 5 | 5 | 5 | 5 | 5 |

|  |  | Comp Ex B | Comp. Ex C | Comp. Ex D |
|---|---|---|---|---|
| Dispersion | g | 30 | 30 | 30 |
| Water | g | 0 | 0 | 0 |
| Dowanol DPM | g | 4.0 | 3.6 | 2.7 |
| Solid formulation | % | 30 | 31 | 32 |
| BYK346 | g | 0.2 | 0.2 | 0 |
| Stains |  |  |  |  |
| Ammonia | 2 min | 5 | 5 | 5 |
| Ethanol 48% | 1 h | 3 | 2 | 2 |
| Red Wine | 6 h | 3 | 3 | 2 |
| Coffee | 1 h | 4 | 3 | 2 |
| Coffee | 16 h | 3 | 3 | 2 |
| Water | 16 h | 5 | 5 | 5 |
| Water | 24 h | 5 | 5 | 5 |

The results as shown in Table 2 and 4 show that the additional use of HDI results in a MFFT reduction (i.e. <5° C. vs 29° C., Ex 1 vs Comp Ex A and 40° C. vs 55° C., Ex 5 vs Comp Ex B, see Table 2), while, even with a lower amount of coalescent (Dowanol DPM), the resistance against ammonia, red wine and water are maintained at the same level, the resistance against ethanol is maintained at the same level or even improved and the resistance against coffee is only deteriorated to a limited extend. Further, additionally comparing Comp Ex C with Comp Ex D shows that the additional use of HDI in case H12MDI is used results in a higher MFFT reduction compared to when IPDI is applied (see Table 2: MFFT reduction due to the use of HDI in case IPDI is used=7° C.; MFFT reduction due to the use of HDI in case H12MDI is used=at least 15° C. (Ex 5 vs Comp Ex B: MFFT reduction of 15° C.; Ex 1 vs Comp Ex A: MFFT reduction is more than 24° C.), while for both IPDI and H12MDI the stain resistances are not significantly affected by the use of HDI.

The invention claimed is:

1. An aqueous coating composition comprising a polyurethane A and a vinyl polymer, wherein
   the polyurethane A is a chain extended reaction product of an amine-based chain extending compound selected from the group consisting of hydrazines, primary diamines, secondary diamines, compounds containing a primary amino group and a secondary amino group, and mixtures thereof with an isocyanate terminated polyurethane pre-polymer comprised of at least the following building blocks:
   (a) at least one polyisocyanate containing at least two cyclic groups,
   (b) at least one non-cyclic aliphatic diisocyanate, wherein the non-cyclic aliphatic group connecting the two isocyanate groups has from 4 to 36 carbon atoms, and
   (c) at least one component containing at least one isocyanate-reactive group, wherein
   a summed amount of (a) and (b) is 10 to 60 wt. %, relative to the total weight amount of components used to prepare the polyurethane A;
   a weight ratio between (a) and (b) is in a range from 50:50 to 99:1,
   the coating composition contains an amount of 1-methyl-2-pyrrolidinone which is less than 3 wt. % by weight of solids content of the coating composition, and wherein
   the coating composition contains tin in an amount of at most 2 ppm.

2. The aqueous coating composition according to claim 1, wherein the weight ratio of (a) to (b) is from 60:40 to 95:5.

3. The aqueous coating composition according to claim 1, wherein the component (a) is selected from the group consisting of polyisocyanates containing at least two cycloaliphatic groups, polyisocyanates containing at least two aromatic groups and mixtures thereof.

4. The aqueous coating composition according to claim 1, wherein the component (a) comprises at least one polyisocyanate containing at least two cycloaliphatic groups.

5. The aqueous coating composition according to claim 1, wherein the component (a) is H12MDI (CAS number 5124-30-1).

6. The aqueous coating composition according to claim 3, wherein the at least one polyisocyanate containing at least two aromatic groups is comprised of a mixture of 4,4'-methylene bis(phenyl isocyanate) and 2,4'-methylene bis(phenyl isocyanate).

7. The aqueous coating composition according to claim 1, wherein the component (b) comprises at least one non-cyclic aliphatic C4-C9 diisocyanate.

8. The aqueous coating composition according to claim 1, wherein the component (b) is 1,6-diisocyanatohexane (CAS number 822-06-0).

9. The aqueous coating composition according to claim 1, wherein the polyurethane A is prepared by:
   (i) forming a neutralized isocyanate-terminated polyurethane pre-polymer which is dispersed in water, and
   (ii) subsequently chain-extending the dispersed pre-polymer with the amine-based chain-extending compound.

10. The aqueous coating composition according to claim 1, wherein the polyurethane A has an acid value which is in a range from 5 to 65 mg KOH/g polyurethane A.

11. The aqueous coating composition according to claim 1, wherein the coating composition has a minimum film formation temperature of lower than 50° C. and contains less than 10 wt. % of a coalescent.

12. The aqueous coating composition according to claim 1, wherein the weight ratio of polyurethane to vinyl polymer present in the coating composition is in a range of 90:10 to 20:80.

13. The aqueous coating composition according to claim 1, wherein the coating composition comprises a polyurethane vinyl polymer hybrid dispersion.

14. The aqueous coating composition according to claim 1, wherein the amount of 1-methyl-2-pyrrolidinone in the aqueous coating composition is 0 wt. %.

15. The aqueous coating composition according to claim 1, wherein the coating composition comprises tertiary amines in amount of at most 1.5 wt. %.

16. The aqueous coating composition according to claim 1, wherein the polyurethane A and the vinyl polymer are present in the aqueous coating composition in a total amount which is in a range from 20 to 55 wt. %, relative to the weight of aqueous coating composition.

17. A process for preparing the aqueous coating composition according to claim 1, the process comprising the steps of:
   I. preparing an isocyanate-terminated polyurethane pre-polymer by reacting at least the components (a), (b) and (c) comprising:
      (a) at least one polyisocyanate containing at least two cyclic groups,
      (b) at least one non-cyclic aliphatic diisocyanate, wherein the non-cyclic aliphatic group connecting the two isocyanate groups has from 4 to 36 carbon atoms, and
      (c) at least one component; and
   (d) adding from 0 to 40 wt. % diluent in step I, wherein the at least one component (c) contains at least one isocyanate-reactive group comprising:
      (c)(i) at least one isocyanate-reactive component containing ionic and/or potentially ionic water-dispersing groups, and/or
      (c)(ii) at least one isocyanate-reactive component containing non-ionic water-dispersing groups, and/or
      (c)(iii) at least one isocyanate-reactive component other than the isocyanate-reactive components (c)(i) and (c)(ii); wherein
   A summed amount of components (a) and (b) is 10 to 60 wt. %, relative to the total weight amount of components used to prepare the polyurethane A;
   A weight ratio between component (a) and component (b) is in a range from 50:50 to 99:1; and
   the amount of component (d) is given relative to the amounts of components (a), (b), (c) and (d);

II. either blending the isocyanate-terminated polyurethane prepolymer with an aqueous phase comprising neutralization agent and optionally comprising further chain extending compound or neutralizing the isocyanate-terminated polyurethane prepolymer by adding neutralizing agent to the isocyanate-terminated polyurethane prepolymer and subsequently (i) adding the neutralized isocyanate-terminated polyurethane prepolymer to water optionally comprising further chain extending compound or (ii) adding water optionally comprising further chain extending compound to the neutralized isocyanate-terminated polyurethane prepolymer; and wherein the process comprises feeding to the reactor, at the start of the reaction to prepare the isocyanate-terminated polyurethane pre-polymer, either (A) components (a) and (b) and at least one of the components (c)(i), (c(ii) and (c)(iii), (B) component (a) and at least two of the components (b), (c)(i), (c(ii) and (c)(iii), or (C) component (b) and at least two of the components (a), (c)(i), (c(ii) and (c)(iii); and wherein the preparation of the polyurethane A is effected in the presence of <3 wt. % of 1-methyl-2-pyrrolidone by weight of the polyurethane A; and wherein (i) the vinyl polymer is introduced into the coating composition before, during or after preparation of the polyurethane and/or (ii) vinyl monomer is added before, during or after preparation of the polyurethane and the vinyl monomer is polymerized in the presence of the polyurethane.

18. The process according to claim 17, wherein the chain-extending of the isocyanate-terminated polyurethane pre-polymer is effected with hydrazine, primary diamines, secondary diamines, compounds containing a primary amino group and a secondary amino group and any mixtures thereof.

19. An aqueous coating composition comprising polyurethane A and less than 1 wt. % of 1-methyl-2-pyrrolidinone by weight of solids content of the coating composition, wherein the polyurethane A comprises as building blocks at least:

(a) at least one polyisocyanate containing at least two cyclic groups, (b) at least one non-cyclic aliphatic diisocyanate, wherein the non-cyclic aliphatic group connecting the two isocyanate groups has from 4 to 36 carbon atoms, and (c) at least one component containing at least one isocyanate-reactive group, wherein a summed amount of (a) and (b) is 10 to 60 wt. %, relative to the total weight amount of components used to prepare the polyurethane A; and wherein a weight ratio between (a) and (b) is in the range from 50:50 to 99:1; and wherein the polyurethane A is prepared by forming a neutralized isocyanate-terminated polyurethane pre-polymer which is dispersed in water, and then subsequently chain extending the dispersed pre-polymer with a chain-extending compound selected from the group consisting of unblocked hydrazine, unblocked primary diamines, unblocked secondary diamines, compounds containing an unblocked primary amino group and an unblocked secondary amino group and mixtures thereof.

20. A coated substrate having a coating on a surface thereof which is obtained by:

(i) applying an aqueous coating composition according to claim 1 onto the surface of the substrate, and (ii) physically drying and optionally curing the aqueous coating composition to obtain the coating.

21. The coated substrate according to claim 20, wherein the substrate is selected from the group consisting of wood, metal, plastic, linoleum, concrete, glass and combinations thereof.

22. The coated substrate according to claim 20, wherein the substrate is wood.

23. A method for coating a substrate selected from the group consisting of wood, metal, plastic, linoleum, concrete, glass and combinations thereof;

wherein the method comprises (i) applying the aqueous coating composition according to claim 1 onto a surface of the substrate; and (ii) physically drying and optionally curing the aqueous coating composition to obtain the coating.

* * * * *